United States Patent
Chen et al.

(10) Patent No.: US 8,091,097 B2
(45) Date of Patent: Jan. 3, 2012

(54) DISTRIBUTED VIRTUAL MACHINE ARCHITECTURE

(76) Inventors: Mark Lawrence Chen, Menlo Park, CA (US); Philip Edward Straw, Menlo Park, CA (US)

(*) Notice: Subject to any disclaimer, the term of this patent is extended or adjusted under 35 U.S.C. 154(b) by 1018 days.

(21) Appl. No.: 11/922,811

(22) PCT Filed: Jun. 22, 2006

(86) PCT No.: PCT/US2006/024827
§ 371 (c)(1),
(2), (4) Date: Dec. 21, 2007

(87) PCT Pub. No.: WO2007/002595
PCT Pub. Date: Jan. 4, 2007

(65) Prior Publication Data
US 2009/0094316 A1    Apr. 9, 2009

Related U.S. Application Data

(60) Provisional application No. 60/692,819, filed on Jun. 22, 2005.

(51) Int. Cl.
*G06F 3/00*    (2006.01)
*G06F 9/44*    (2006.01)
*G06F 9/46*    (2006.01)
*G06F 13/00*    (2006.01)

(52) U.S. Cl. ..................................... 719/332

(58) Field of Classification Search .................. 719/332
See application file for complete search history.

(56) References Cited

U.S. PATENT DOCUMENTS
2004/0015966 A1* 1/2004 MacChiano et al. .............. 718/1
2005/0080837 A1* 4/2005 Wieczorek et al. ........... 709/200

OTHER PUBLICATIONS

Sirer, "Design and implementation of a distributed virtual machine for networked computers" 1999, ACM pp. 1-15.*

* cited by examiner

*Primary Examiner* — S. Sough
*Assistant Examiner* — Timothy A Mudrick
(74) *Attorney, Agent, or Firm* — Cascio & Zervas; Anthony T. Cascio; Charles H. Jew

(57) ABSTRACT

A distributed virtual machine architecture includes a virtual machine client (16) and a virtual machine server (32). The virtual machine client provides a platform upon which an application may be run on a host device (12). The virtual machine server may appear anywhere within the network to which the host of the virtual machine client is connected (14). When the application request a class, the virtual machine client determines such class exists on the local host (12) or a client proxy exist for the class. If neither exists, the virtual machine client connects to the virtual machine server to send a request for the class. If a proxy does exist, a proxy is returned to the virtual machine client. However, if a proxy does not exist, the virtual machine server dynamically generates the proxy (34) to be returned to the virtual machine client.

23 Claims, 5 Drawing Sheets

DISTRIBUTED VIRTUAL MACHINE ARCHITECTURE

RELATED APPLICATION DATA

The present application claims priority from commonly owned co-pending U.S. Application for Provisional Patent, Application No. 60/692,819 filed 22 Jun. 2005.

BACKGROUND OF THE INVENTION

1. Field of the Invention

The present invention relates generally to software architectures that provide platforms for distributed computing in a computer network and more particularly to a novel distributed virtual machine architecture that provides a platform on which existing network and standalone applications may execute in a network mode independent of any other underlying platform within the network.

2. Description of the Related Art

Distributed computing is the process of aggregating the computing resources of several computing entities to run collaboratively a single computational task in a transparent and coherent way, so that these entities appear as a single, centralized system. Various types of hardware and software systems on which processes may be distributed throughout a network of computing devices are known. Of primary importance to the disclosure herein are software systems that are designed to connect the users and computing resources of network devices in a transparent, open, and scalable way. The network itself may be any type of local area or wide area network interconnecting computing devices, as well as any interconnected combinations of any of these networks.

In one type of framework for distributed computing, several components of executable code are concurrently running on different computing devices in the network. In this particular framework, each of these components, although distributed among different network devices, is nonetheless designed to operate in a standalone mode on its respective host device. Distributed computing in this framework is then made possible by a system of protocols that enable any one of these components running upon one network device to exchange data over the network with a complementary component running on another network device. Two specific examples of the forgoing framework include the client-server and the peer-to-peer frameworks.

In an exemplary client-server framework, executable code running on the client sends, such as in response to user input entered into a user interface, a request for data over the network to the server. Executable code at the server, operating in response to the client request, generates the data and then sends the data back over the network to the client device. The code running at the client then processes the received data and renders such data for the user interface. Furthermore, many such clients may be making requests for data from a single server. Accordingly, not only does such server provide a service to multiple clients, it may also need to manage resources of the network on which such server and clients reside.

In an exemplary peer-to-peer framework there is no dedicated network device that provides a service or manages the network resources. Instead, all responsibilities are uniformly divided among all network devices, known as peers. For example, in some file sharing systems similar components of executable code are respectively running at two peers and each are generating data in response to user input. This data is then transferred between the peers over the network and the executable code at each peer receiving the data then renders such data for the user interface.

Although application processes running on the above exemplary frameworks are generally referred to as network applications, the code running on each network device to implement the exchange of data over the network is a fully functional standalone application on its host. It is only through consuming data, which has been developed at another network device and received from the network, do such application processes provide a useful user experience.

Moreover, in the above exemplary client-server framework, the server in particular bears the onus of the computational overhead of the network application by generating data in response to requests from multiple clients. Each client merely renders and formats the received data it receives in a prescribed protocol for the user interface. As the data is changing at the server, the previously rendered data at any client remains static until it is updated by a further request from such client. Accordingly, the computing resources of the networked devices are minimally aggregated.

Other software systems for distributed computing are known in which a network application may utilize more fully the aggregate computing resources of the network devices. However, in general, these systems may impose a significant burden on the programmer tasked with writing the network application by requiring the implementation and administration of features that are not central to the functioning of its distributed components. Examples of these systems are native implementations of network applications and XML messaging.

Native implementations of the network application are inherently limited in their ability to execute on a variety of different platforms, because any native implementation of the network application must be written and maintained for every target platform on which the network application will execute. Accordingly, these native implementations disadvantageously bind the program developers into a regimen of release versions tailored for every change of any one of the target platforms. Furthermore, changes to any one of the target platforms may further disadvantageously limit the programmer's ability to provide and distribute bug fixes and to maintain compatibility with the variety of platforms.

XML messaging, commonly used in web based frameworks such as SOAP, J2EE, and some proprietary technologies such as Macromedia's Flash and ActionScript, are inherently limited due to interoperability problems. For example, each component of executable code receiving an XML message must have knowledge of the XML tags from a document type definition or schema; otherwise the code will be unable to interpret the data. XML messaging is further disadvantageous in that it is an extremely inefficient method for transmitting data structures between each component of code.

Many network applications are now developed using object oriented programming, which is a method of programming that abstracts a computer program into manageable sections. The basis of object oriented programming is the concept of encapsulation.

Encapsulation is a methodology that combines the subroutines, or methods, that manipulate data with the declaration and storage of that data. This encapsulation prevents the data from arbitrarily being accessed by other program subroutines, or objects. When an object is invoked, the associated data is available and can be manipulated by any of the methods that are defined within the object to act upon the data.

The basic component of encapsulation is a class. A class is an abstraction for a set of objects that share the same structure and behavior. An object is a single instance of a class that retains the structure and behavior of the class. Objects also contain methods that are the processes that instruct an object to perform some procedure or manipulation of data that the object controls. Classes may also be characterized by their interface that defines the elements necessary for proper communication between objects.

In an object oriented distributed computing platform an object in a first network device, or a first address space, may seamlessly communicate with and manipulate an object contained in a second network device, or second address space. This type of distributed computing platform also allows for the removal of the communication protocols from the application components, or objects, and placement of the protocols in a mid-level software layer that manages communications across a computer network to facilitate a client's access to and manipulation of data contained on a server.

Distributed computing and object oriented programming have led to the development of distributed object management systems. These distributed object management systems are generally referred to as object request brokers. When an object on a client requests access to an object that exists on a server, the distributed object management system provides the communication link between the two devices and, thus, between the two objects. The distributed object management system removes the requirement of the client object communicating directly with the server object. Instead, current distributed object management systems utilize a remote proxy object on the client which models the interface of the server object. The client that requested access to the server object communicates with the remote proxy object that exists on the client. Therefore, the client can operate as if it is communicating directly with a local object. The remote proxy object contains the necessary communications information to allow the client to access and manipulate an object that actually exists on the server. Remote proxies allow the client to disregard the location of the requested object and the communication details.

A proxy is an object that has an interface and method list identical to another object. However, it does not contain the same detailed computer code. Instead it contains communications facilities that allow the proxy to communicate directly with another object without knowledge of the requesting object. Proxies can be used to control access to certain objects. They may also be used to remove the labor of network communications from local objects. For example, if object A residing on a first device needs to communicate with object B residing on a second device, object A must know the location of object B and have the necessary computer code to initiate communications with object B. A proxy for object B located on the first device allows object A to simply communicate with the proxy of object B as if object B resided on the same device. The proxy for object B has all the necessary information and computer code to communicate with the real object B on the second device. This type of proxy is known as a remote proxy since it exists on a device remote from the device that contains the requested object.

Systems heretofore known have required all possible remote proxies to be built when the software is initially compiled and loaded. This process imposes an administrative burden in ensuring that proxies are current with respect to the objects from which they are generated. In addition, software system designers must predict every possible remote proxy that may be needed in the future so that it can be built when the software is loaded. This process does not allow a system to adapt to its usage and environment. The requirement to implement and administer these features makes it disadvantageously difficult to write the code for a networked application, thereby limiting the availability of code that can truly be implemented in a distributed manner.

Furthermore, existing standalone software may need to be used within a distributed computing system. Many conventional object request brokers require an interface for each class for proper communications across a network. A user may not have access to the source code or may be restricted by license as to modifying the source code. Thus, the user may not be able to add interfaces, which allow classes to be used remotely in a distributed computing network, to class files within the existing software.

The object request brokers, described above, receive messages, determine the location of the receiving object, route the message to the receiving object, and perform all necessary platform and language translations. In object oriented programming, a message is typically a request sent to an object to change its state or to return a value. The object has encapsulated methods to implement the response to the received message. Using known prior art techniques, such as DCOM and CORBA, objects can communicate with remote objects residing in other network devices.

The availability of different object request brokers from different developers has resulted in several different communication protocols for transmission and reception of messages across a network. The communication protocol used by a particular object request broker may be referred to as its native protocol or native format. Conventional remote proxies generally have the communication protocol hard coded within the proxy.

CORBA compliant object request brokers utilize stubs and skeletons to provide inter-object communications across a network. The stub is on the requester side and sends messages across the network to a skeleton on the remote object side. The stub and skeleton take care of certain communication details between the requestor and the remote object. CORBA compliant object request brokers generally use a utility to generate a stub and skeleton for each class using information provided in an Interface Description Language (IDL) file for each object. However, when designing such network applications, there is disadvantageously a need to regenerate the stubs and skeletons during each iteration of the code-debug cycle.

Enterprise Java Beans (EJB) is an object oriented programming specification developed by Sun Microsystems for use with its Java™ computer programming language. When using EJB, certain mechanisms are interposed as an intermediate layer between a client object and a server object. This is generally accomplished by creating a wrapper class having the same methods as the object being wrapped and adding wrapping code in each method of the wrapper class. An example of the wrapping code would be adding security to the wrapped object such as limiting access to client objects with the proper password or key. Wrapper classes are generally generated at run time and add additional complexity to the distributed processing system in addition to negatively impacting system performance.

The Java™ programming language is an object-oriented programming language that is typically compiled into a platform-independent format, using a byte code instruction set, which can be executed on any platform supporting the Java virtual machine (JVM). Because the JVM may be implemented on any type of platform, implementing distributed programs using the JVM may significantly reduce the difficulties associated with developing network applications for distributed computing. Moreover, the JVM uses a Java remote method invocation system (RMI) that enables communication among programs of the system.

For example, in distributed computing using the Java programming language, objects flow between one network device and another network device when each network device transmits and receives method invocations using the JVM. For example, the first network device uses the RMI system for responding to a call for an object by converting the object into a byte stream, including an identification of the type of object transmitted and data constituting the object. While the first network device is responding to the call for the object, a process running either on the first network device or the second network device may continue operation without waiting for a response to its request.

The second network device receives the byte stream of the object. Using the RMI system, the second network device automatically converts the byte stream into the corresponding object, which is therefore a copy of the object and makes the object available for use by a program executing on the second network device. The second network device may also transmit the object to yet another network device by first converting the object into a byte stream and then sending it to the other network device, which also automatically converts the byte stream into the corresponding object.

The communication between these network devices sometimes involves, for example, repeated calls for the same information. These calls are made to a local proxy, which acts as a surrogate for the remote object in the address space of the client. Such a proxy will service the call by making a network request to the server object. Repeated calls to the same server object through a proxy can disadvantageously generate considerable network traffic, increasing the time and expense of obtaining the information. A further disadvantage and limitation of the Java RMI is that the programmer is required to add a special "remote" interface to the classes, and then run an offline utility to generate the proxies before the program is run.

As a result of these foregoing disadvantages and limitations of the prior art, interoperability among networked applications of any kind is virtually nonexistent. Native applications and web applications function largely in their separate universes, that is, despite the rhetoric of being called "networked applications," they are in reality an aggregation of stand alone applications, each of which executes on its own dedicated device and merely exchanging data files across the network.

SUMMARY OF THE INVENTION

It is therefore an object of the present invention is to overcome one or more disadvantages and limitations of the prior art enumerated above. A primary object of the present invention is to provide a platform independent software architecture wherein pieces of application code or objects can execute anywhere within the architecture, such as before or after being transmitted between individual nodes within such architecture. It is a further object of the present invention to provide a computing architecture wherein applications can interoperate not only by means of data exchange but can actually run pieces of one another's code. Yet another object to the present invention is to provide a software architecture wherein each user manages its own identity centrally on the desktop.

According to the present invention, a distributed virtual machine architecture includes a virtual machine client and a virtual machine server. The virtual machine client provides a platform upon which an application may be run on a host device. The virtual machine server may appear anywhere within the network to which the host of the virtual machine client is connected. When the application requests a class, the virtual machine client determines whether such class or a proxy for it exists on the local host. If neither exists, the virtual machine client connects to the virtual machine server to send a request for the class. In response to request, the virtual machine server determines whether a proxy exists for the class. If a proxy does exist, a proxy is returned to the virtual machine client. However, if a proxy does not exist, the virtual machine server dynamically generates the proxy to be returned to the virtual machine client.

A primary feature of the present invention is the dynamic generation of proxies. This feature advantageously obviates the requirement of known proxy generators to define an interface that is implemented and write the proxy to the interface. Instead, the automatic proxy generation of the present invention need only require that any class be identified as a server class.

A feature of the present invention is that a server component is provided as a set of objects, so that any client can dynamically become a server thereby allowing applications, such as instant messaging, VOIP and SMS, to communicate peer-to-peer thereby relieving the server of the necessity to handle large volumes of network traffic. Another feature the present invention is the ability to implement drag and drop capabilities within a client for example, instant messaging can be dropped into an SMS application sent to a peer via the SMS or EMS protocol and executed as code at the remote end. Yet another feature of the present invention is to allow applications to gain access to identity related information through a unified identity object that supplies individual pieces of information, such as an email address, phone number, credit card number, etc., as appropriate. This feature advantageously improves both privacy and convenience because access is controlled according to a single user defined policy.

These and other objects, advantages and features of the present invention will become readily apparent to those skilled in the art from a study of the following Description of the Exemplary Preferred Embodiments when read in conjunction with the Attached Drawing and appended Claims.

DESCRIPTION OF THE EXEMPLARY PREFERRED EMBODIMENTS

Figure 1:
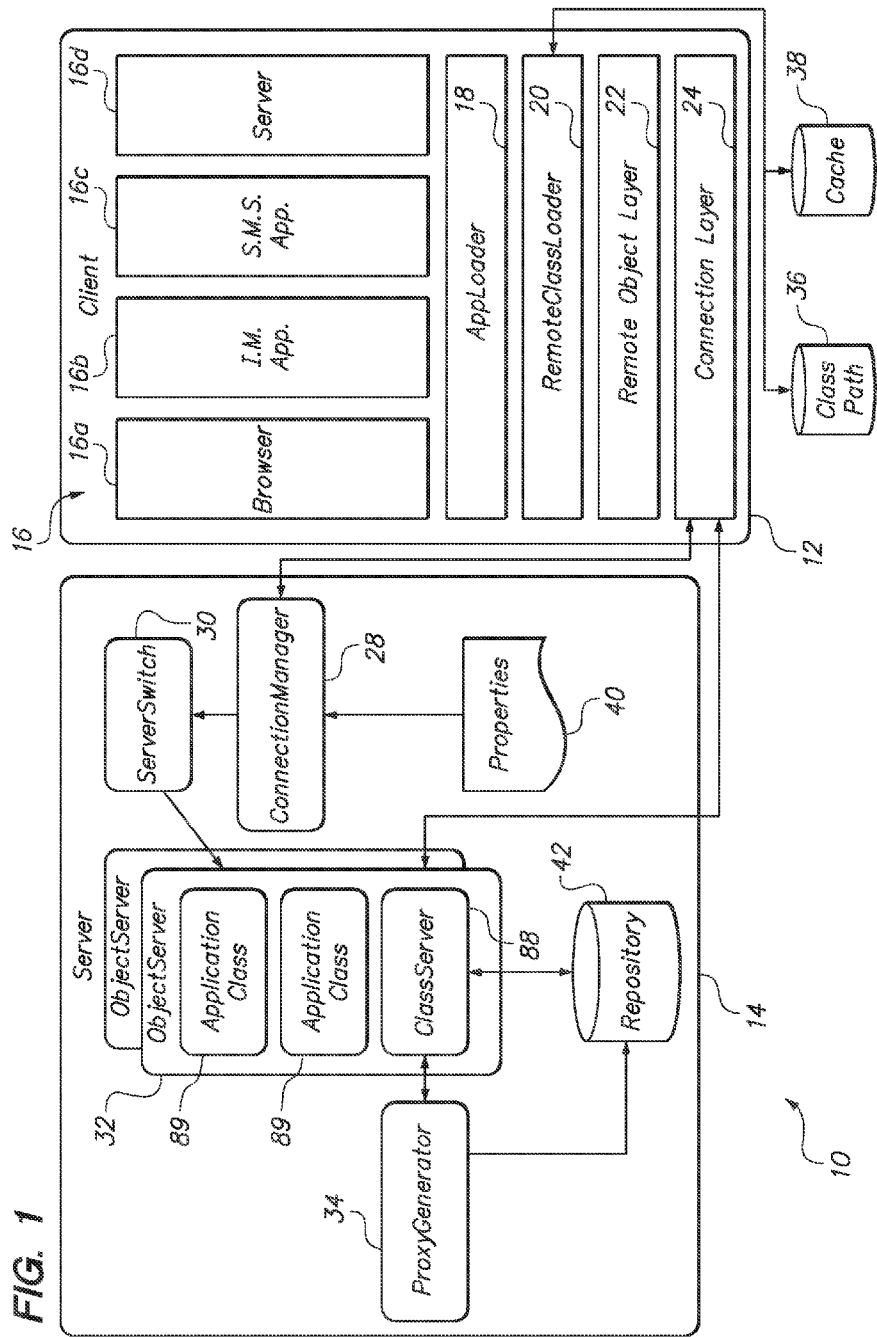
FIG. 1 is a schematic block diagram of distributed virtual machine architecture constructed according to the principles of the present invention.

Referring now to FIG. 1, there is shown a distributed virtual machine (VM) software architecture 10 of the present invention. The architecture 10 includes a VM client 12 and a VM server 14. It is to be understood that the VM client 12 and VM server 14 do not respectively reside on, nor refer to, a client and server of a network, as such terms are typically understood, but may reside on any device of such network, as will be made apparent to those skilled in the art from the following description.

The VM client 12 in accordance with the present invention provides a platform on which one or more conventional applications 16 may execute. Any of these applications may be of the type that produces and consumes data only on the local device on which it executes or of the type that produces and consumes data transmitted on a network, such as the applications of the type described above. In cooperation with the VM server 14, the execution of these applications may be distributed across network devices that have been enabled by the VM architecture 10, without the need to write native code for each network device or to predetermine all possible proxies and stubs for distributed objects as required by the prior art as described above.

As best seen in FIG. 1, the applications 16 may exemplarily include a browser 16$_a$, an Instant Messaging (IM) application 16$_b$ and a Short Message Service (SMS) application 16$_c$, each of these being of the type that produce and consume network data, yet have executable components of these applications executing on various network devices to produce and consume such data, when each network device is enabled by the distributed VM architecture 10 of the present invention. Other exemplary applications of this type include Voice over IP (VoIP), e-mail and web mail applications, and targeted advertising applications, among many others. The applications 16 may also include a server 16$_d$.

Any one of the application 16, when running on the VM client 12 may further share capabilities or exchange data with any other application 16 also running on the VM client 12 without the use of XML messaging or transfer of data files. Furthermore, any application that normally produces and consumes data only on its local device, such as an office productivity application, may be accessed and run from one network device although the actual execution is performed on another network device when each network device is also enabled by the distributed VM architecture 10 of the present invention.

The VM client 12 includes an application loader 18, a remote class loader 20, a remote object layer 22, a connection layer 24. The VM server 14 includes a connection manager 28, a server switch 30, at least one object server 32 and a proxy generator 34. Accessible to the remote class loader 20 is a class path memory 36 and a local cache 38, each of which is preferably located on the same network device upon which the VM client 12 resides. Accessible to the connection manager 28 is a properties file 40, and accessible to the proxy generator 34 is a class repository 42, wherein each of the properties table 40 and the repository 42 may preferably be located on the same network device upon which the VM server 14 resides.

Figure 2:
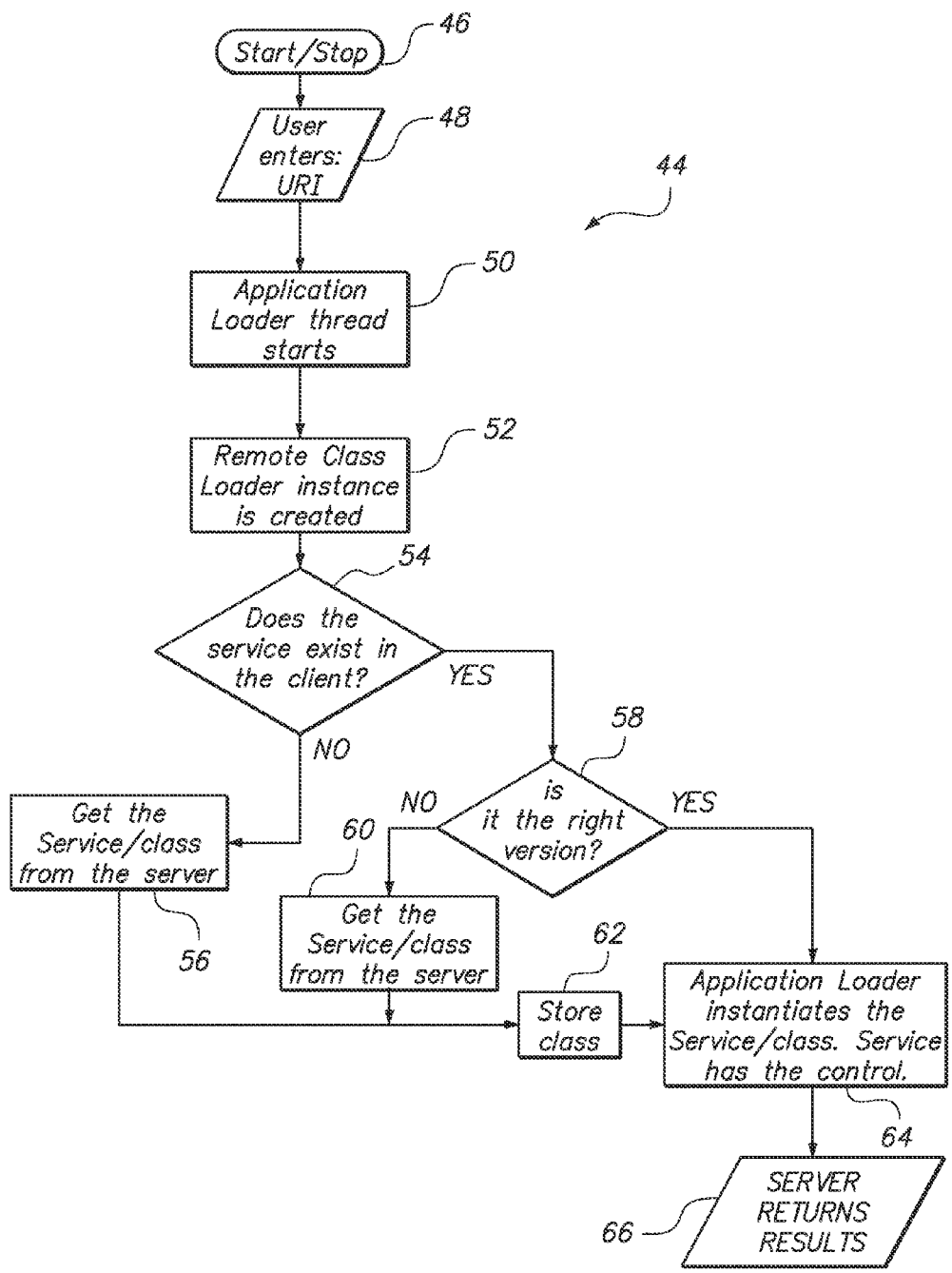
FIG. 2 is a flowchart of an exemplary sequence implemented at the client of the distributed virtual machine architecture of FIG. 1.

Referring now to FIG. 2, there is shown a flowchart 44 of an exemplary method by which the above described architecture of the VM client 12 provides a platform on which the applications may run. The VM client 12 is launched to provide a conventional browser-like user interface, as indicated at 46, and the URL of one of the applications 16 is entered, as indicated at 48, into the user interface. In accordance with the present invention, the URL of the application 16 is of the form vm://class, wherein the protocol identifier vm is an exemplary preselected string of ASCII alpha characters used to indicate that the application 16 is to be run on the VM client 12 and the resource name class is the identity of the application 16.

The user interface passes the entered URL to the application loader 18 and, in response, the application loader 18 starts a new application thread, as indicated at 50. The application 16 identified by the resource name class will execute in this thread. The application loader 18, in passing the URL to the remote class loader 20, then starts a new instance of the remote class loader 20, as indicated at 52.

In response to receiving the URL from the application loader 18, the present instance of the remote class loader 20 decides, as indicated at 54, whether the identified class exists in the local device on which the VM client 12 is running. To make such decision, the remote class loader 20 first looks to the local class path memory 36 for the identified class, and if not found therein, then to the local cache 38, for the identified class.

If the class is not found on the local device, the class is obtained from the VM server 14, described in greater detail hereinbelow, as indicated at 56. At the VM client 12, the remote class loader 20 invokes the remote object layer 22, which in turn invokes the connection later 24 to establish a connection with the VM server 14. The remote object layer 22 and the connection layer 24 provide the necessary communication protocols, as well known in the art, to establish a connection with the VM server 14.

Moreover, if the class is found locally, a determination is made, as indicated at 58, whether the found class is the current version. If the class is not the current version, the class is obtained from the VM server 14, as indicated at 60. Subsequent to either event of the class being obtained from the VM server 14, as indicated at 56 or 60, the class is stored in the local cache 38, as indicated at 62.

The class specified by the resource name of the URL, after having been obtained as described above, is instantiated by the application loader 18 via the remote class loader 20, as indicated at 64. The application loader then starts the application by invoking the loaded class' main method.

The application runs within the protection domain attached to its code source. The application inherits the instance of the remote class loader 20 that loaded it. As described above, some objects instantiated by the application are automatically loaded by the same instance of the remote class loader 20, either from the local class path memory 36 or from the local cache 38, or from the VM server 14 that supplied the class. The application exercises remote classes, which are classes running on the VM server, as indicated at 66, automatically via transparent proxies.

Figure 3:
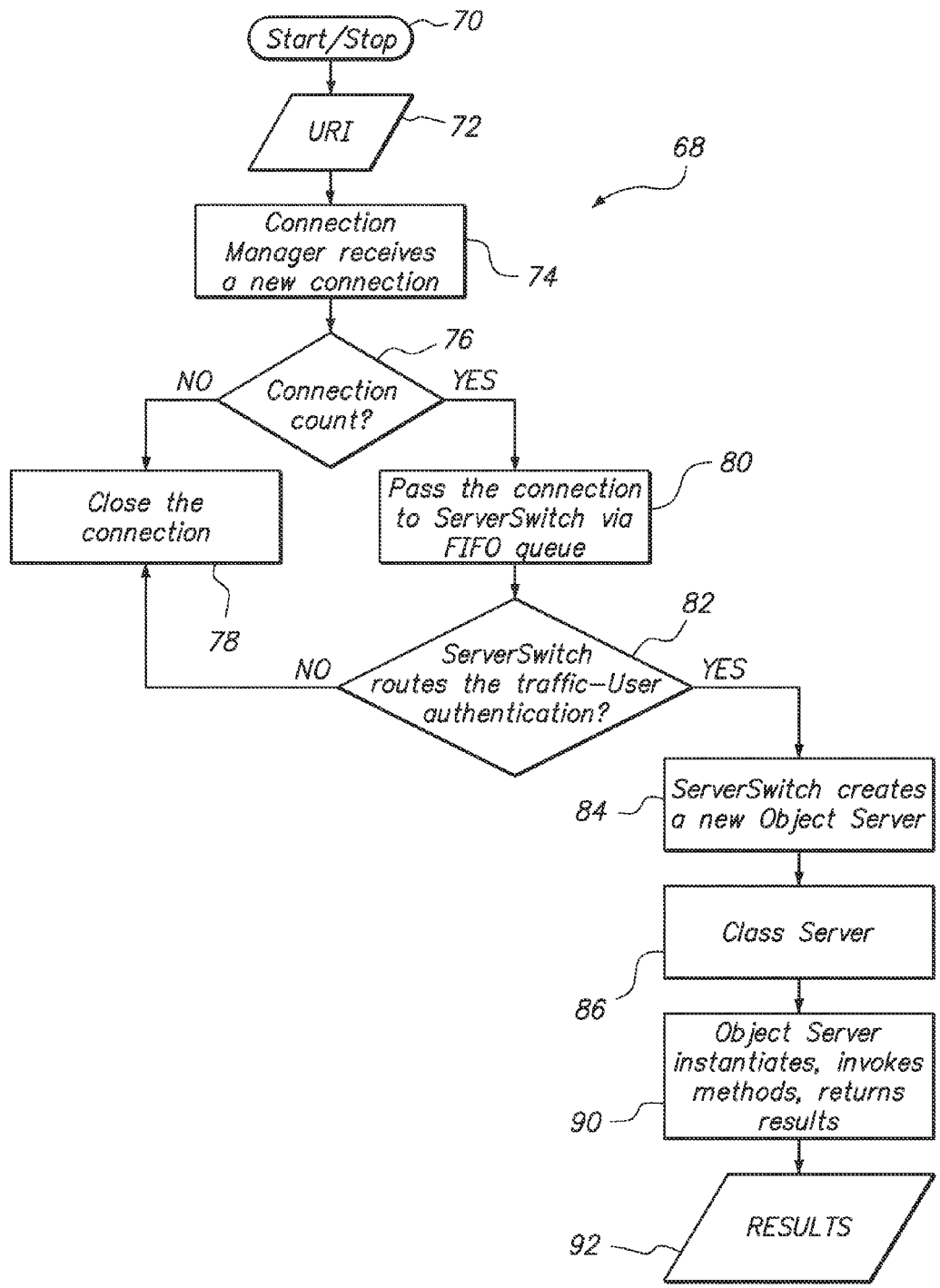
FIG. 3 is a flowchart of an exemplary sequence implemented at the server of the distributed virtual machine architecture of FIG. 1.

Referring now to FIG. 3, there is shown a flowchart 68 of an exemplary method implemented by the VM server 14 to provide the remote class to the VM client 12. As indicated at 70, the VM client 12 is launched so that the VM server 14 can respond to a request for class specified by the resource name of the URL, as indicated at 77, should the VM client 12 need to obtain the class from the VM server 14 as described above.

In response to such request, the connection manager 28 receives a request for a new connection, as indicated at 74, from the connection layer 24 of the VM client 12. As indicated at 76, the connection manager determines if its connection count has been exceeded. If yes, the connection is closed, as indicated at 78. Otherwise, the connection is passed to the server switch 30, as indicated at 80. In particular, the connection is passed via a first-in first-out queue that allows the VM server 14 to support very high-volume without exceeding the connection backlog limit of the underlying operating system upon which the VM server 14 runs.

The server switch 30 obtains input and output streams from the connection layer 24 of the VM client 12 and inspects the first part of the input stream to determine where the traffic should be routed. If the connection is a request for access to served classes or objects, then the connection is defined as an object server connection. Other possibilities determinable from the input stream are for conventional connections to a stateless server (not shown) or a J2EE server (not shown).

For object server connections, the server switch 30 may determine whether user authentication is required, as indicated at 82. To determine if authentication is required, the server switch 30 via the connection manager 28 checks the properties file 40. Alternatively, a separate system-state class to hold properties may be utilized. If the properties file 40 indicates that authentication is required and the user is not authenticated, the connection is closed as indicated at 78. If authentication is not required, or is required and the user is authenticated, the server switch 30 creates a new instance of an object server 32 in the VM server 14, as indicated at 84. The new instance of the object server 32 is a new object server thread to which the input and output streams from the connection layer 24 of the VM client 12 is passed, as best seen in FIG. 1.

In a typical case, the object server 32 first services class server requests made by the remote class loader 22 on the VM client 12. As indicated at 86, each instance of the remote class loader 22 has its own persistent connection to an object server thread running a class server 88 within the object server 32 (FIG. 1). Similarly as described above, for each requested class the class server 88 checks the version number in the request to determine if a newer version is available. If so, the class server 88 next checks to see if the class is annotated, as described below, as a "VM server class". If the class is not a VM server class, it is returned. Within the object server 32 are application class instances 89 for each instance of classes belonging to an application 16 but running on the VM server 14.

If the class is annotated as a VM server class, the class server 88 checks the repository 42 to see if a proxy for the class is available. If the proxy is available and current, it is returned. If the proxy is either not available or not current, the class server passes the class to the proxy generator 34 which generates, saves, compiles and returns the proxy in place of the requested class. The application 16 will then use the proxy as if it were the requested class, and the requested class itself, if instantiated, runs on the class server 88.

As indicated at 90, the object server 32 instantiates, invokes methods on, and returns results from objects as directed by the VM client 12 and as allowed by the properties file 40. In addition to the authentication information described above, the properties file 40 list all classes that can be instantiated by the object server 32 and the number of instances of each class that can exist globally at one time. Server side object state persists over the life of the connection between the object server 32 and the remote class loader 20.

The object server 32 keeps a list of objects active and also removes the object from the list of objects active. For example, all proxies have a finalization method. When a proxy process is terminated, the corresponding object process is also terminated. Accordingly, memory and resources used by the corresponding object on the VM server 14 are released.

The VM architecture 10, as described above, allows for various modes of deploying applications to be run at a user device at which the VM client 12 has been installed. For a standalone application, such application runs entirely on the user device. No code or configuration changes are required to this application, and the VM architecture 10 functions as an intelligent dynamic installer by supplying those application classes and libraries as they are demanded by the application, instead of the known prior art practice of downloading entire libraries. Users may run the application by entering its URL into the user interface of the VM client 12. Downloaded code is cached normally on the user device.

Pre-existing client-server applications may also de deployed in another mode. From the standpoint of the VM architecture 10, this mode is identical to the above described mode for the standalone application. The client and server parts of the application already include their own communications and protocol code, so the VM architecture 10 simply acts as an installer for the client part.

In yet another mode, if a standalone application is well designed, such application may be enabled as a network application. To enable a standalone application, a one line annotation may be added to the classes that need to run on the VM server 14, for example, public static final byte VMServerClass=0.

When the part of the application running on the VM client 14 requests a class containing this annotation, a proxy is generated at the VM server 14, as described above, and the proxy is transparently returned in place of the requested class. Any use of this class by the VM client 12 then exercises, via the proxy, the original class running on the VM server 14.

In another mode, a network application is specifically written for the VM architecture 10. It should be apparent that this mode is substantially similar to the above described mode of the standalone application enabled as a network application. In other words, the programmer simply writes the application as if it were standalone, maintaining a clean separation between classes that manipulate server side resources and those that don't, then annotates server classes as described above. It is also possible to gain precise control over the VM architecture 10 by writing to the remote connection and remote object layers of the framework directly.

In yet another mode, a peer-to-peer application may be written specifically for the VM framework 10. The VM server 14 need only be loaded and run in the VM client 12.

Furthermore, the classes requested by the client can also be checked whether the class or its proxy is the correct version. The version can be determined by a static variable or annotation placed inside the class. The variable is named according to a convention, for example, "VMVERSION_1_0_0."

Figure 4:
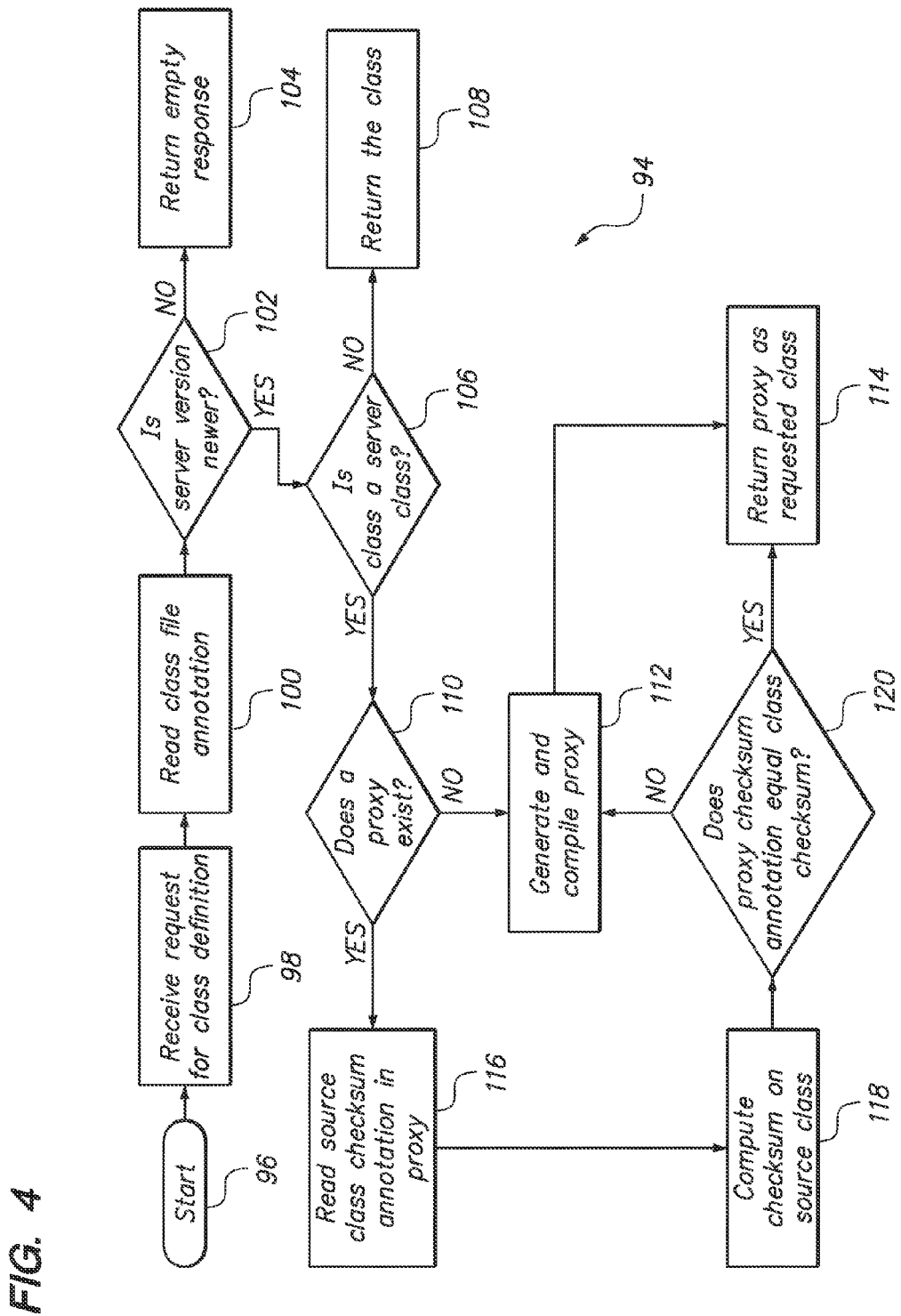
FIG. 4 is a flowchart of versioning and automatic proxy generation implemented by the class server of FIG. 1.

Referring now to FIG. 4, there is shown a flowchart 94 useful to describe in greater detail the versioning and proxy generation performed by the class server 88 of FIG. 1. As indicated at 96, a new thread instance in the object server 32 initiates the class server 88 running within the object server 32. The class server 88, as indicated at 98, receives a request for a class definition as hereinabove described. The request contains the version number of the class, if any, already held at the VM client 12. The class server 88, as indicated in 100, reads the class file from the repository 42 (FIG. 1) and searches the class definition for a version-identifier annotation.

A decision is made, as indicated at 102, whether the class definition retrieved from the repository 42 is newer than the version requested by the VM client 12. If not, the class server 88 returns an empty response, as indicated at 104. The empty response informs the VM client 12 that its own version of the class definition is current.

Otherwise, if the version of the class definition in the repository 42 is newer than the class definition requested by the VM client 12, or if the VM client 12 does not have the class at all, the class server 88 determines, as indicated at 106, whether the class definition contains the server class annotation, described above, that indicates the requested class must be instantiated on the VM server 14 and not the VM client 12. If no such annotation is found, the class server 88 returns the class to the VM client 12, as indicated at 108.

However, if the requested class is annotated as a server class, the class server 88 determines, as indicated at 110, if a proxy exists for the class in the repository 42. If a proxy does not exist, the proxy generator 34 dynamically generates and compiles a proxy, as indicated at 112. The class server 88 then writes the newly created proxy to the repository 42 and returns the proxy to the VM client 12, as indicated at 114.

Otherwise, if a proxy does exist in the repository 42, the class server 88 reads its "source class checksum" annotation, as indicated at 116. The class server 88 then computes the checksum on the original class definition, as indicated at 118. A determination is made, as indicated at 120, whether the source class checksum annotation in the proxy and the computed checksum on the source class are equal. If the two checksums are equal, the class server 88 returns the cached proxy from the repository 42 to the VM client 12.

If the checksums are not equal, the proxy generator 34 generates and compiles the new proxy, as described above and 112. This new proxy replaces the cached proxy in the repository 42 and is returned to the VM client 12.

A proxy dynamically generated as above has exactly the same name and same method declarations as the requested class. The proxy also inherits from the same parent, and implements the same interfaces. Furthermore, the proxy propagates all exceptions that might be thrown either by its source object or by other parts of the VM architecture 10.

Whether the server 88 returns the requested class or proxy class, the VM client 12 treats the return result as if it were the requested class. Any action performed on the proxy is related by the proxy to the proxy's source object, which exists on the VM server 14. Results returned by the VM server 14 are passed back through the proxy to the VM client 12.

Figure 5:
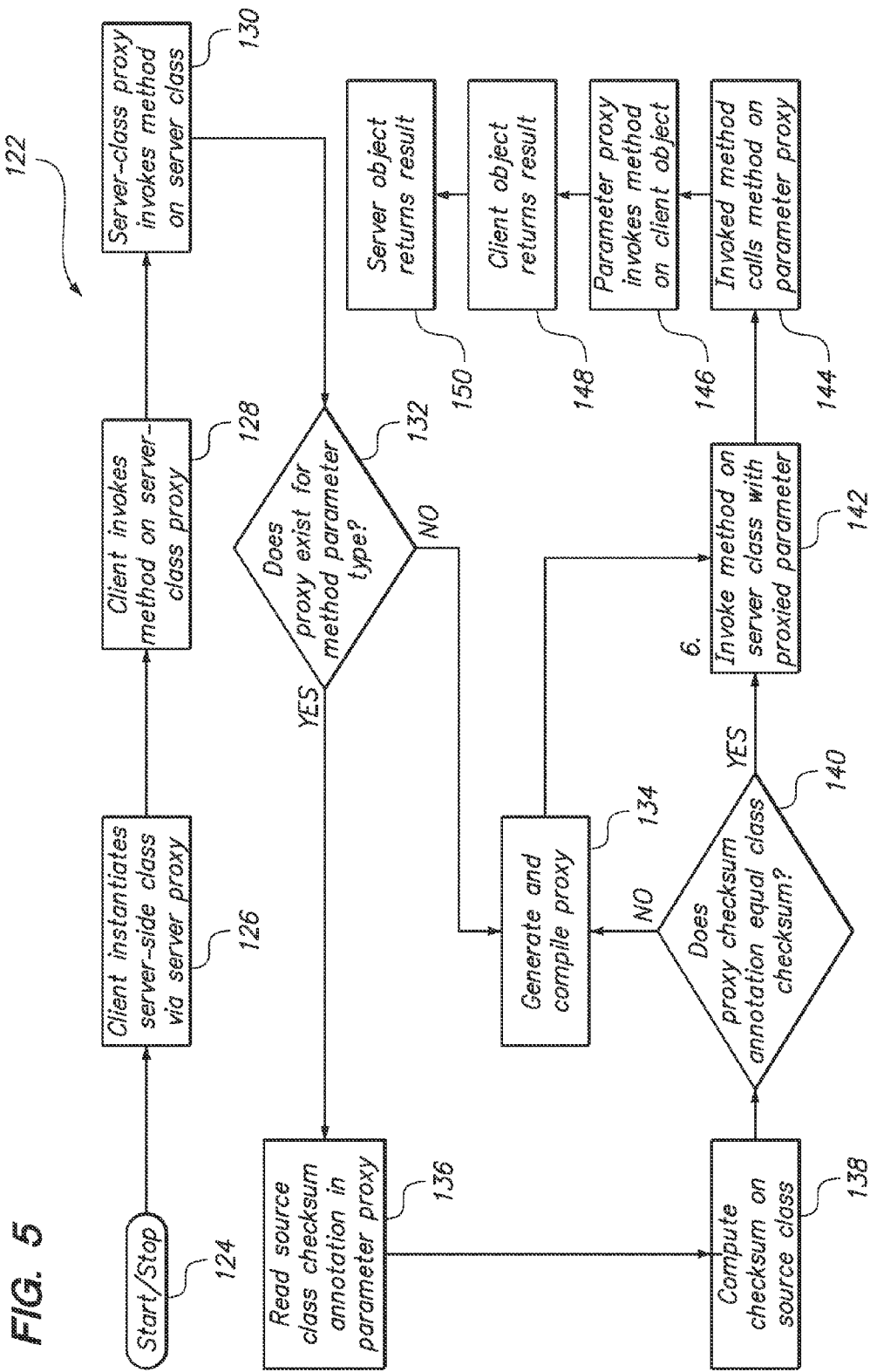
FIG. 5 is a flowchart of an exemplary sequence implemented in the distributed virtual machine of FIG. 1 using dynamically generated client proxies.

Referring now to FIG. 5, there is shown a flowchart 122 showing a more elaborate use of the dynamically generated client proxies at the VM client 12. As described above, with reference to FIG. 4, the VM client 12 has obtained a server class proxy, as indicated at 124. The VM client 12 instantiates the server side class by creating an instance of the class on the class server 88 via the proxy, as indicated at 126.

The VM client 12 invokes a method on the server class, as indicated at 128. The VM client 12 sends a handle that references a client side object in place of the method's parameter, and the server class proxy invokes a method on the server class, as indicated that 130.

As indicated at 132, the class server 88 determines whether the repository 42 contains a proxy for the parameter. If no proxy exists, the proxy generator 34 dynamically generates and compiles the proxy, as indicated at 134. Otherwise, if the parameter proxy exists in the cache repository 42, the class server 88 reads this source class checksum annotation, as indicated and 136, and computers the checksum on the original parameter class definition, as indicated at 138.

A determination is made, as indicated at 140, by the class server 88 whether the two checksums are equal. If yes, the class server 88 returns the cached parameter proxy to the VM client 12. If the two checksums are not equal, the proxy generator 34 generating compiles a new proxy, as indicated at 134, and this new proxy replaces the proxy in the repository 42.

In either event, the object server 32 invokes the method on the server class, as indicated at 142. This is the same method invoked by the VM client 12, indicated that 128. When invoking the method, the class server 88 substitutes the parameter proxy for the parameter. The invoked method calls methods and the parameter proxy, as indicated at 144, and the parameter proxy remotely calls methods and the original parameter residing in the VM client 12, as indicated at 146.

The VM client 12 returns results to the server object via the parameter proxy, as indicated at 148. The VM server 14 returns its results to the VM client 12 via the server proxy, as indicated at 150.

The parameter proxy is generated as a subclass of the original parameter class. It contains an embedded reference or handle to the real parameter object that resides in the VM client 12. The VM architecture 10 can create proxies either by generating and compiling source code or by generating byte codes directly.

Following is a pseudo-code example of a proxy method called "go" that takes one parameter of type "A" and returns a string that may be automatically generated and returned when the VM client 12 requests a "server-class"-annotated class from the server:

String go (A param)

```
{
// Pass the parameter to the local (client-side) object responsible for
// taking proxied calls from the server, and get back a handle:
ObjectHandle paramHandle = peerServer.addRef (param);
// Call the server-side method using the handle in place of the parameter
// and return the result. The "serverObject" object contains communications
// code and a handle to the proxied object (the real version of which resides
// on the server) implementing the "go" method:
return serverObject.call ("go", new ObjectHandle [ ] {paramHandle});
}
```

An exemplary server-side method that receives proxy requests from the VM client 12 is as follows:

```
void receiveProxiedCall (ObjectHandle objectHandle,
String methodName, Object[ ] paramList)
{
// Get the parameter types expected by the called method:
Class [ ] paramTypes = getParamTypes (objectHandle, methodName);
// Create an array to hold the parameter proxies:
Object [ ] paramProxies = new Object [paramTypes.length];
// Get a proxy for each parameter. If a proxy for the parameter type exists
// and is current, it will be loaded; otherwise, it will be created. Note that
// these proxies are subclasses of the original parameter class:
for (/* each element of paramTypes */)
{
paramProxies [currentElement] = getProxy (paramTypes
[currentElement]);
}
// Invoke the requested method with proxies in place of the parameters
// and return a result to the client:
sendToClient (invokeMethod (objectHandle, methodName,
paramProxies));
}
```

In the forgoing example, the "go" method executes with proxies in place of its normal parameter list. All parameters get proxied except for immutable types.

There has been described above novel methods and apparatus in a distributed virtual machine architecture. Those skilled in the art may now make numerous uses of, and departures from, the above described embodiments without departing from the inventive concepts disclosed herein.

What is claimed as the invention is:

1. A distributed virtual machine architecture comprising:
a virtual machine client including an application loader and a remote class loader, said virtual machine client residing on a host device and providing a platform upon which an application executes at said host device and a user interface in which to launch said application, said application being identified to said interface as a URL in the form of vm://class wherein vm is a protocol identifier to indicate that said application is to be run on said virtual machine client and class is a resource name identifying said application, said user interface being operative to pass said URL to said application, said application loader in response to said URL being passed thereto being operative to initiate a new application thread, said virtual machine client determining in response to a request for a class from said application whether said class exists on said host device wherein said remote class loader in response to said application loader passing said URL thereto is operative to determine whether said class is resident on said host device and, in the event said class is resident on said host device, is further operative to obtain said class from said host device; and a virtual machine server, said virtual machine client connecting to said virtual machine server in the event said class does not exist on said host device to request said class from said virtual machine server, said virtual machine server determining whether a proxy for said class exists and in the event said proxy does exist said virtual machine server returning said proxy to said virtual machine client.

2. A distributed virtual machine architecture as set forth in claim 1 wherein said application identified by resource name is executed in said thread.

3. A distributed virtual machine architecture as set forth in claim 1 wherein said host device includes a local class path memory, said remote class loader when operative to determine whether said class is resident on said host device being further operative to determine whether said class is found in said local class path memory.

4. A distributed virtual machine architecture as set forth in claim 1 wherein said host device includes a local cache, said remote class loader when operative to determine whether said class is resident on said host device being further operative to determine whether said class is found in said local cache.

5. A distributed virtual machine architecture as set forth in claim 1 wherein said remote class loader is further operative to determine whether said class is a current version of said class, and in the event said class is not said current version said remote class loader being further operative to obtain said class from said virtual machine server.

6. A distributed virtual machine architecture as set forth in claim 5 wherein said virtual machine client further includes: a remote object layer invoked by said remote class loader in the event said remote class loader determines said class is not resident on said host device; and a connection layer invoked by said remote object layer and operative to establish a connection to said virtual machine server.

7. A distributed virtual machine architecture as set forth in claim 5 wherein said host device includes a local cache, said remote class loader being operative to store said class obtained from said virtual machine server in said local cache.

8. A distributed virtual machine architecture as set forth in claim 1 wherein, in the event said class is not resident on said host device, said remote class loader is further operative to obtain said class from said virtual machine server.

9. A distributed virtual machine architecture as set forth in claim 8 wherein said virtual machine client further includes: a remote object layer invoked by said remote class loader in the event said remote class loader determines said class is not resident on said host device; and a connection layer invoked by said remote object layer and operative to establish a connection to said virtual machine server.

10. A distributed virtual machine architecture as set forth in claim 8 wherein said host device includes a local cache, said remote class loader being operative to store said class obtained from said virtual machine server in said local cache.

11. A distributed virtual machine architecture as set forth in claim 1 wherein said application loader in response to said remote class loader having obtained said class being operative to instantiate said class and further to invoke a main method of said class.

12. A distributed virtual machine architecture as set forth in claim 11 wherein said class obtained from said virtual machine server is invoked via a transparent proxy.

13. A distributed virtual machine architecture as set forth in claim 1 wherein said virtual machine server includes a connection manager operative to manage connections made from said virtual machine client to send said request.

14. A distributed virtual machine architecture as set forth in claim 13 wherein said connection manger is further operative to determine whether a maximum connection count is exceeded by said connection made for said request, and in the event said count is exceeded, said connection manager being further operative to close said connection.

15. A distributed virtual machine architecture as set forth in claim 14 wherein said virtual machine server further includes a server switch, said connection manager being operative to pass said connection to said server switch in the event said count is not exceed.

16. A distributed virtual machine architecture as set forth in claim 15 wherein said virtual machine client includes a connection layer, said connection being established between said connection layer and said connection manager.

17. A distributed virtual machine architecture as set forth in claim 15 wherein said virtual machine server further includes a properties file, said server switch being operative to access said properties files to determine whether said connection requires user authentication.

18. A distributed virtual machine architecture as set forth in claim 1 wherein said virtual machine server includes an object server, said virtual machine server being operative to initiate a new instance of said object server for each request for said class made by said virtual machine client.

19. A distributed virtual machine architecture as set forth in claim 18 wherein each instance of said object server is an object server thread, said virtual machine client including a connection layer passing input and output streams to said object server thread.

20. A distributed virtual machine architecture as set forth in claim 19 wherein each instance of said object server includes a class server, and further wherein each instance of said remote class loader has a persistent connection to a respective object server thread running a corresponding object server.

21. A distributed virtual machine architecture as set forth in claim 18 wherein each instance of said object server includes a plurality of class instances belonging to said application.

22. A distributed virtual machine architecture as set forth in claim 18 wherein each instance of said object server is operative to instantiate and invoke methods on objects requested from said virtual machine client and further operative to return results to said virtual machine client.

23. A distributed virtual machine architecture as set forth in claim 18 wherein said virtual machine server includes a proxy generator operative to compile and return a proxy for said class.

* * * * *